US011827021B2

United States Patent
Chen et al.

(10) Patent No.: US 11,827,021 B2
(45) Date of Patent: Nov. 28, 2023

(54) APPLYING MOLD CHASE STRUCTURE TO END PORTION OF FLUID EJECTION DIE

(71) Applicant: Hewlett-Packard Development Company, L.P., Spring, TX (US)

(72) Inventors: Chien-Hua Chen, Corvallis, OR (US); Christopher A. Leonard, Corvallis, OR (US); Anthony M. Fuller, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 316 days.

(21) Appl. No.: 17/297,612

(22) PCT Filed: Feb. 6, 2019

(86) PCT No.: PCT/US2019/016769
§ 371 (c)(1),
(2) Date: May 27, 2021

(87) PCT Pub. No.: WO2020/162908
PCT Pub. Date: Aug. 13, 2020

(65) Prior Publication Data
US 2022/0009231 A1    Jan. 13, 2022

(51) Int. Cl.
| | | |
|---|---|---|
| *B41J 2/16* | (2006.01) | |
| *B41J 2/045* | (2006.01) | |
| *B29C 45/14* | (2006.01) | |
| *B29C 45/00* | (2006.01) | |
| *B29L 31/00* | (2006.01) | |
| *B41J 2/14* | (2006.01) | |

(52) U.S. Cl.
CPC ........ *B41J 2/1637* (2013.01); *B29C 45/0046* (2013.01); *B29C 45/14639* (2013.01); *B41J 2/04501* (2013.01); *B29L 2031/7678* (2013.01); *B41J 2002/14362* (2013.01); *B41J 2202/01* (2013.01)

(58) Field of Classification Search
CPC ........ B41J 2/04501; B41J 2/16; B41J 2/1637; B41J 2002/14362; B41J 2202/01; B41J 2202/11; B29C 45/0046; B29C 45/14418; B29C 45/114639
See application file for complete search history.

(56) References Cited

U.S. PATENT DOCUMENTS

| | | | |
|---|---|---|---|
| 8,517,514 | B2 | 8/2013 | Diett |
| 9,724,920 | B2 * | 8/2017 | Chen ................ B41J 2/1601 |
| 10,068,878 | B2 | 9/2018 | Kim et al. |

(Continued)

FOREIGN PATENT DOCUMENTS

| | | |
|---|---|---|
| CN | 108349254 A | 7/2018 |
| JP | S61125852 | 6/1986 |

(Continued)

*Primary Examiner* — Anh T Vo
(74) *Attorney, Agent, or Firm* — Foley & Lardner LLP

(57) ABSTRACT

A method includes applying a mold chase to a fluid ejection die to at least partially define at least one cavity. The mold chase includes a feature to contact a fluid ejection portion of the fluid ejection die, and at least one structure separate from the feature to contact a first end portion adjacent a first end of the fluid ejection die. The method includes filling the at least one cavity with a mold compound to produce a molded carrier for the fluid ejection die.

13 Claims, 11 Drawing Sheets

(56) References Cited

U.S. PATENT DOCUMENTS

| | | | |
|---|---|---|---|
| 2016/0001465 A1 | 1/2016 | Chen et al. | |
| 2016/0001558 A1* | 1/2016 | Chen | B41J 2/1637 347/50 |
| 2016/0009084 A1* | 1/2016 | Chen | B41J 2/14 347/44 |
| 2016/0009085 A1 | 1/2016 | Chen et al. | |
| 2018/0154632 A1 | 6/2018 | Chen et al. | |
| 2018/0222194 A1* | 8/2018 | Chen | B41J 2/1634 |
| 2018/0326724 A1* | 11/2018 | Chen | B41J 2/1637 |

FOREIGN PATENT DOCUMENTS

| | | |
|---|---|---|
| KR | 101238949 | 3/2013 |
| WO | WO-2015119320 | 8/2015 |

* cited by examiner

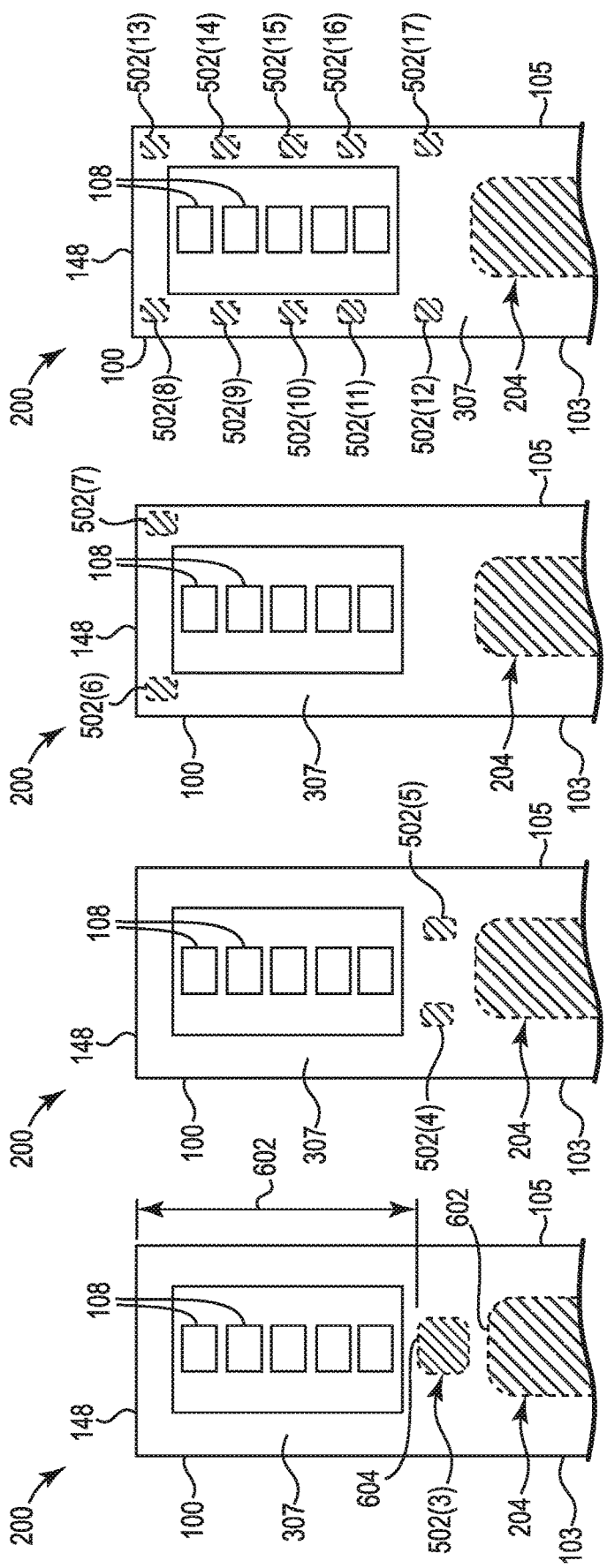

APPLYING MOLD CHASE STRUCTURE TO END PORTION OF FLUID EJECTION DIE

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

BRIEF DESCRIPTION OF THE DRAWINGS

FIGS. 6-12 are diagrams illustrating a top view of a portion of the fluid ejection device shown in FIG. 2 according to one example.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Examples of the present disclosure are directed to a fluid ejection device, and a method of manufacturing a fluid ejection device in a manner that reduces or eliminates the formation of epoxy molding compound (EMC) on contact pads positioned near ends of the fluid ejection die. This unintended EMC formation on the contact pads is referred to as EMC flash. During the process, an upper mold chase is applied to the back-side surface of the fluid ejection die. The EMC is then applied to the fluid ejection die using a transfer molding process. The upper mold chase includes a slot forming feature that covers ink feed holes of the fluid ejection die during the application of the EMC, and defines a slot in the resulting EMC panel for providing fluid to the ink feed holes. The length of the feature of the upper mold chase defines the length of the slot, and this length is less than the length of the fluid ejection die. Reducing the space between an end of the feature and an end of the fluid ejection die can reduce or eliminate EMC flash on the contact pads. In one example, the process results in a fluid ejection device with a length between an end of the slot and an end of the fluid ejection die that is less than 1.5 mm. In one example, at least one hold down structure is added to the upper mold chase to make contact with an end portion of the fluid ejection die to reduce or eliminate the EMC flash.

Figure 1:
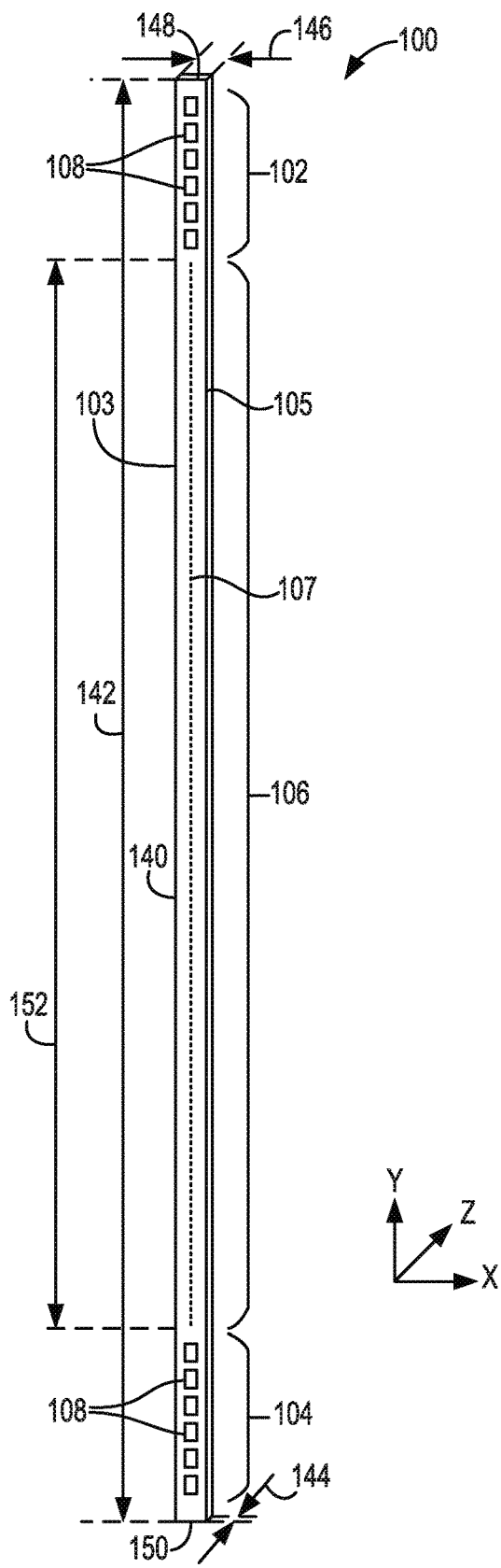
FIG. 1 is a diagram illustrating a fluid ejection die according to one example.

FIG. 1 is a diagram illustrating a fluid ejection die 100 according to one example. Die 100 includes a first longitudinal end portion 102 that includes a plurality (e.g., six in the illustrated example) of contact pads 108, a second longitudinal end portion 104 that includes a plurality (e.g., six in the illustrated example) of contact pads 108, and a fluid ejection portion 106 that includes a plurality of fluid actuation devices 107. The contact pads 108 in the second longitudinal end portion 104 are longitudinally aligned (i.e., not laterally offset) with the contact pads 108 in the first longitudinal end portion 102, and are positioned at a distance 152 (i.e., along the Y axis) from the contact pads 108 in the first longitudinal end portion 102.

The plurality of fluid actuation devices 107 is disposed longitudinally to the contact pads 108 in the first longitudinal end portion 102 and the contact pads 108 in the second longitudinal end portion 104. The plurality of fluid actuation devices 107 is also arranged between the contact pads 108 in the first longitudinal end portion 102 and the contact pads 108 in the second longitudinal end portion 104. In the illustrated example, the contact pads 108 in the first longitudinal end portion 102, the contact pads 108 in the second longitudinal end portion 104, and the plurality of fluid actuation devices 107 are each arranged in a column, and the three columns are longitudinally aligned. In one example, fluid actuation devices 107 are nozzles or fluidic pumps to eject fluid drops.

Die 100 includes an elongate semiconductor (e.g., silicon) substrate 140 having a length 142 (along the Y axis) between lateral ends 148 and 150, a thickness 144 (along the Z axis), and a width 146 (along the X axis) between lateral ends 103 and 105 of the die 100. In one example, the length 142 is at least twenty times the width 146. The width 146 may be 1 mm or less and the thickness 144 may be less than 500 microns. The fluid actuation devices 107 and the contact pads 108 are provided on the elongate substrate 140 and are arranged along the length 142 of the elongate substrate. The fluid actuation devices 107 have a swath length 152 less than the length 142 of the elongate substrate 140. In one example, the swath length 152 is at least 1.2 cm. The contact pads 108 in the first longitudinal end portion 102 may be arranged near a first longitudinal end 148 of the elongate substrate 140. The contact pads 108 in the second longitudinal end portion 104 may be arranged near a second longitudinal end 150 of the elongate substrate 140 opposite to the first longitudinal end 148.

Figure 2:
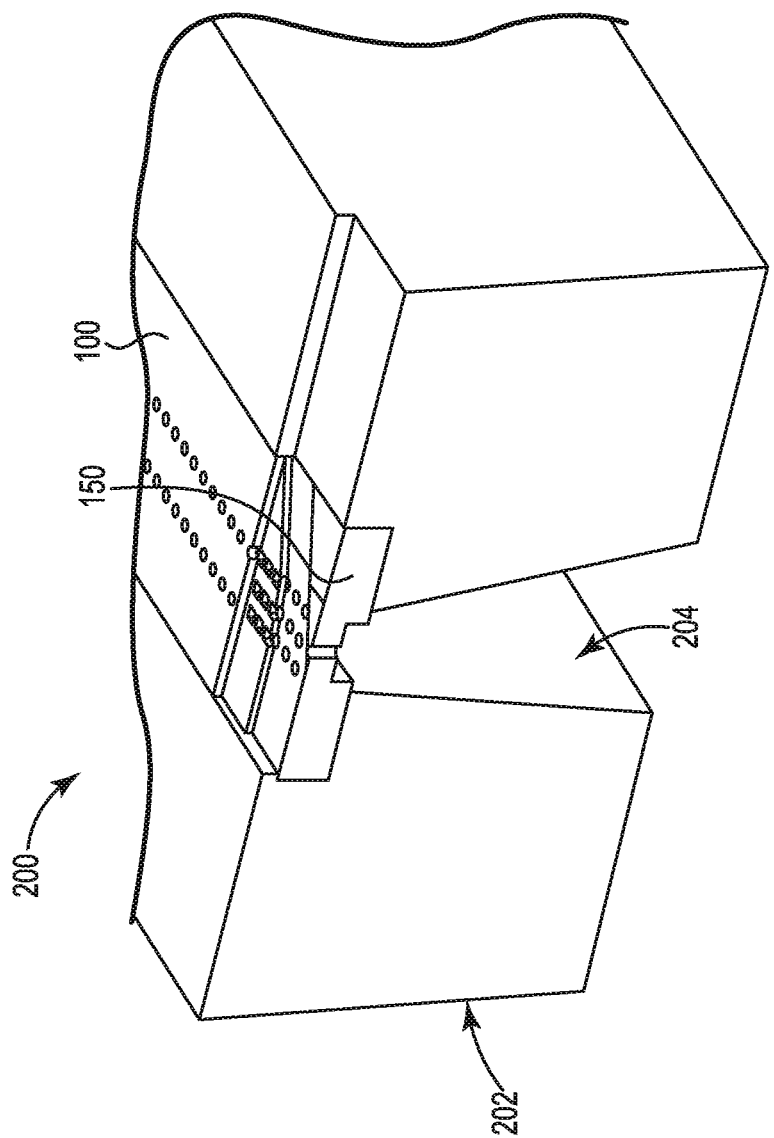
FIG. 2 is a diagram illustrating a fluid ejection device according to one example.

FIG. 2 is a diagram illustrating a fluid ejection device 200 according to one example. Fluid ejection device 200 includes a fluid ejection die 100 attached to a carrier 202. In one example, the carrier 202 is a rigid, molded carrier that is formed by a transfer molding processes. A slot 204 is formed in the carrier 202 to provide fluid to the back side of the fluid ejection die 100. In one example, the slot 204 extends longitudinally along the fluid ejection die 100, and is longitudinally aligned with the plurality of fluid actuation devices 107 (FIG. 1).

Figure 3:
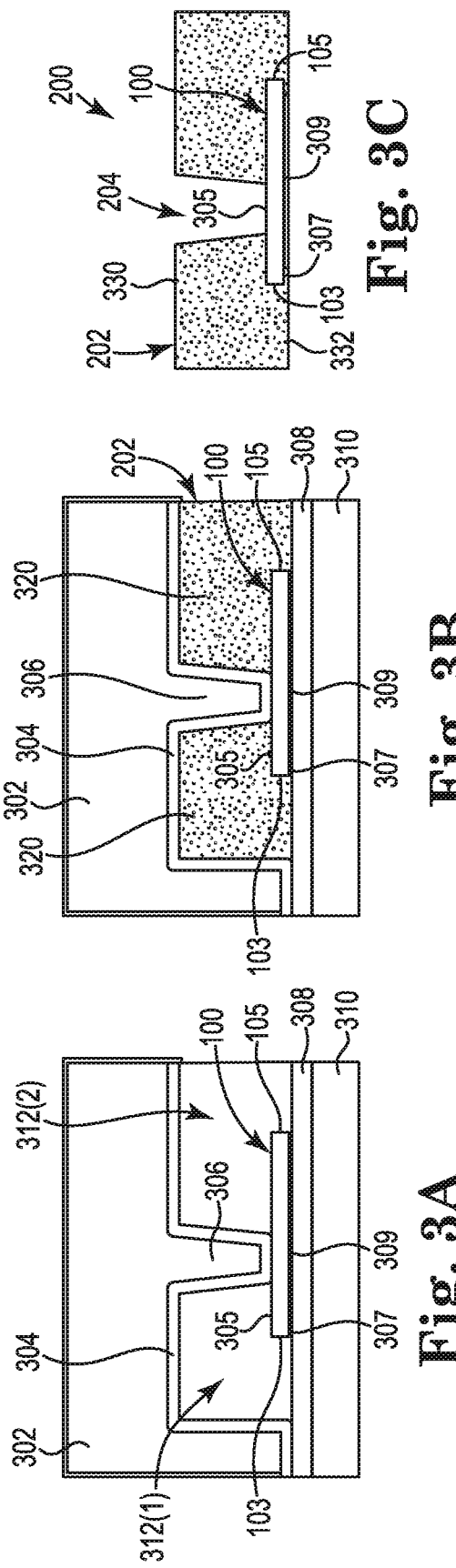
FIGS. 3A-3C are diagrams illustrating a method of forming the fluid ejection device shown in FIG. 2 according to one example.

FIGS. 3A-3C are diagrams illustrating a method of forming the fluid ejection device 200 shown in FIG. 2 according to one example. As shown in FIG. 3A, fluid ejection die 100 is positioned on a release tape layer 308, which is positioned on a die carrier 310. More specifically, fluid ejection die 100 is positioned with a front-side surface 307 facing the release tape layer 308 and the die carrier 310. A nozzle layer 309 is formed on the front-side surface 307 of the fluid ejection die 100. Upper mold chase 302 is positioned over fluid ejection die 100 (and die carrier 310). More specifically, upper mold chase 302 is positioned over fluid ejection die 100 with back-side surface 305 of fluid ejection die 100 facing upper mold chase 302. Upper mold chase 302 includes a slot forming feature 306 that seals fluid feed holes formed in fluid ejection die 100 to protect the fluid feed holes during molding. Upper mold chase 302 includes a bottom surface that defines cavities 312(1) and 312(2) (collectively referred to as cavities 312) between upper mold chase 302 and die carrier 310.

In one example, a release liner 304 is positioned along the bottom surface of upper mold chase 302 so as to be positioned between fluid ejection die 100 and upper mold chase 302. Release liner 304 helps to prevent contamination of upper mold chase 302 and minimize flash during the molding process.

As shown in FIG. 3B, cavities 312 are filled with mold material 320, such as an epoxy mold compound, plastic, or other suitable moldable material. Filling cavities 312 with mold material 320 forms a carrier 202 around fluid ejection die 100. In one example, the molding process is a transfer molding process and includes heating the mold material 320 to a liquid form and injecting or vacuum feeding the liquid mold material into cavities 312 (for example, through runners that communicate with cavities 312). The feature 306 of the upper mold chase 302 (as positioned along back-side surface 305 of fluid ejection die 100) helps to prevent the mold material from entering the fluid feed holes of die 100 as cavities 312 are filled.

As shown in FIG. 3C, after the mold material cools and hardens to a solid, upper mold chase 302 and liner 304 are removed, and fluid ejection die 100 and carrier 202 are removed or released from die carrier 310. Thus, carrier 202 is molded to include molded back-side surface 330 and molded front-side surface 332, with molded front-side surface 332 substantially coplanar with front-side surface 307 of fluid ejection die 100, and molded back-side surface 330 extending beyond back-side surface 305 of fluid ejection die 100. As such, carrier 202 has a thickness that is greater than the thickness of fluid ejection die 100. In addition, front-side surface 307 of fluid ejection die 100 and a portion of back-side surface 305 of fluid ejection die 100 both remain exposed from carrier 202 (i.e., are not covered by mold material of carrier 202). While one fluid ejection die 100 is illustrated in FIGS. 3A-3C as being molded into carrier 202, a greater number of fluid ejection dies 100 may be molded into carrier 202.

The shape of the slot 204 is usually a result of particular slotting process (e.g., laser, anisotropic wet etch, dry etch, or a combination of these), and these processes may have a limited influence on the profile of the slot 204 that can be produced. Examples disclosed herein enable a transfer mold process with slot molding by reducing or eliminating the contact pad EMC flash issue, as described in further detail below.

Figure 4:
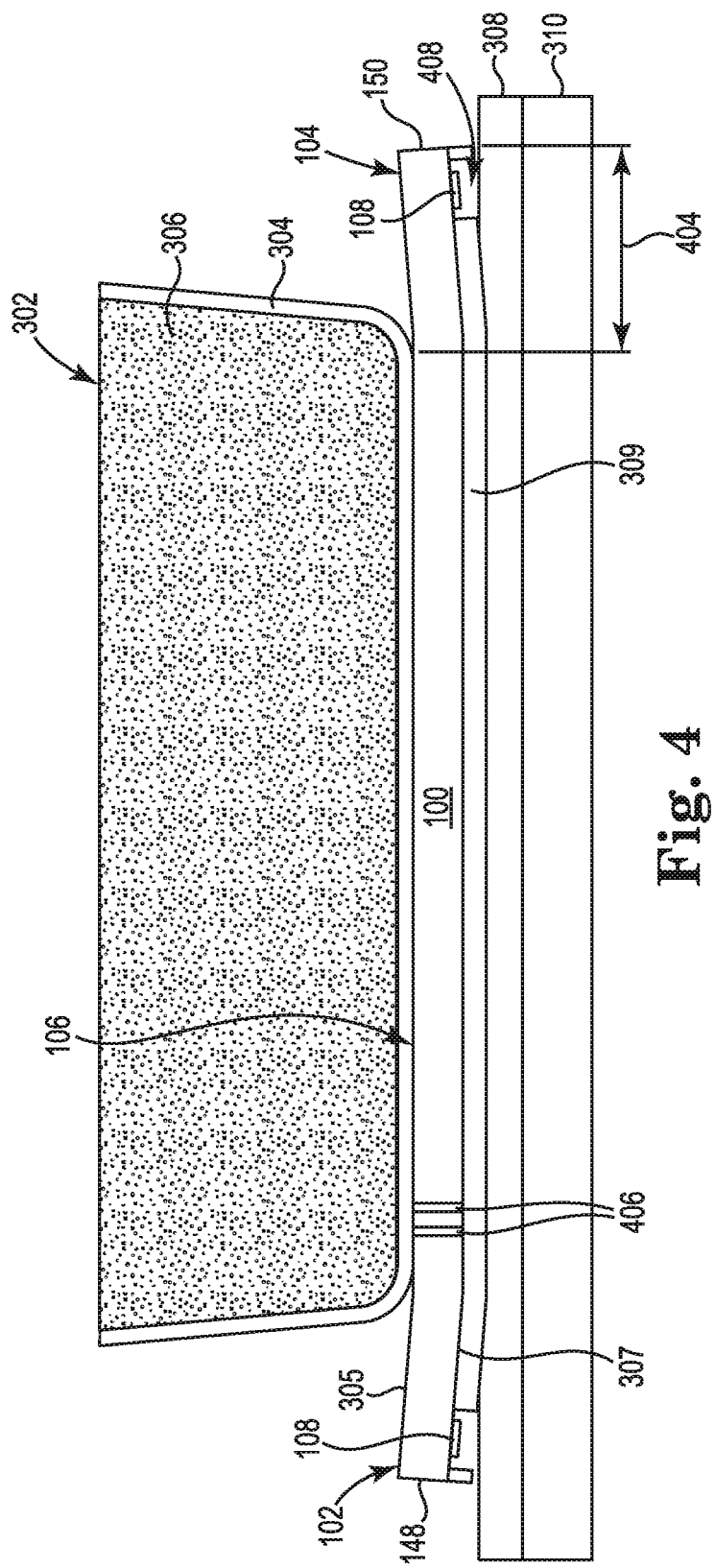
FIG. 4 is a diagram illustrating the application of an upper mold chase to a fluid ejection die according to one example.

FIG. 4 is a diagram illustrating the application of an upper mold chase 302 to a fluid ejection die 100 according to one example. As shown in FIG. 4, a nozzle layer 309 is formed on the front-side surface 307 of the fluid ejection die 100, and the die 100 and the nozzle layer 309 are positioned on a release tape layer 308. The release tape layer 308 is positioned on die carrier 310. Feature 306 of upper mold chase 302 is positioned over fluid ejection die 100 with back-side surface 305 of fluid ejection die 100 facing feature 306. A plurality of fluid feed holes 406 extend through the fluid ejection die 100. Although two fluid feed holes 406 are shown in FIG. 4 to simplify the Figure, the fluid ejection die 100 may include more or less than two fluid feed holes 406, and the fluid feed holes 406 may be positioned across the length of the fluid ejection portion 106 of the die 100. The feature 306 seals the fluid feed holes 406 formed in fluid ejection die 100 to protect the fluid feed holes 406 during molding. Release liner 304 is positioned along the bottom surface of feature 306 so as to be positioned between fluid ejection die 100 and feature 306.

One challenge in the slot molding process is keeping the contact pads 108 at the longitudinal ends 148 and 150 of the die 100 free from the EMC flash. The fluid ejection die 100 sits on top of the release tape layer 308, which, in one example, is a compliant layer that is about 100 um thick. The feature 306 of the upper mold chase 302 contacts and applies force to the fluid ejection portion 106 of the fluid ejection die 100, but not the end portions 102 and 104 of the die 100. This force can cause the fluid ejection portion 106 of the die 100 to sink into the release tape layer 308, and cause the end portions 102 and 104 to tilt up toward the upper mold chase 302 during the molding process. This tilting can cause a gap 408 that results in EMC flash in the regions of the contact pads 108.

The length 404 between the end of the feature 306 and the end 150 of the die 100 is referred to herein as the cantilever length, which plays a role in addressing the contact pad EMC flash issue. Examples of the present disclosure use a short cantilever length 404 to reduce or eliminate the contact pad EMC flash issue. In one example, one or both of the end portions 102 and 104 have a cantilever length 404 that is less than 1.5 mm. In another example, one or both of the end portions 102 and 104 have a cantilever length 404 that is less than 1.3 mm. In yet another example, one or both of the end portions 102 and 104 have a cantilever length 404 that is less than 1.1 mm.

In addition to providing a short cantilever length 404, or as an alternative to providing a short cantilever length 404, the upper mold chase 302 may include at least one hold-down structure to apply a downward force to at least one of the end portions 102 and 104 of the fluid ejection die 100 during the molding process. The hold-down structures are independent of the configuration of the feature 306 and the slot 204.

Figure 5:
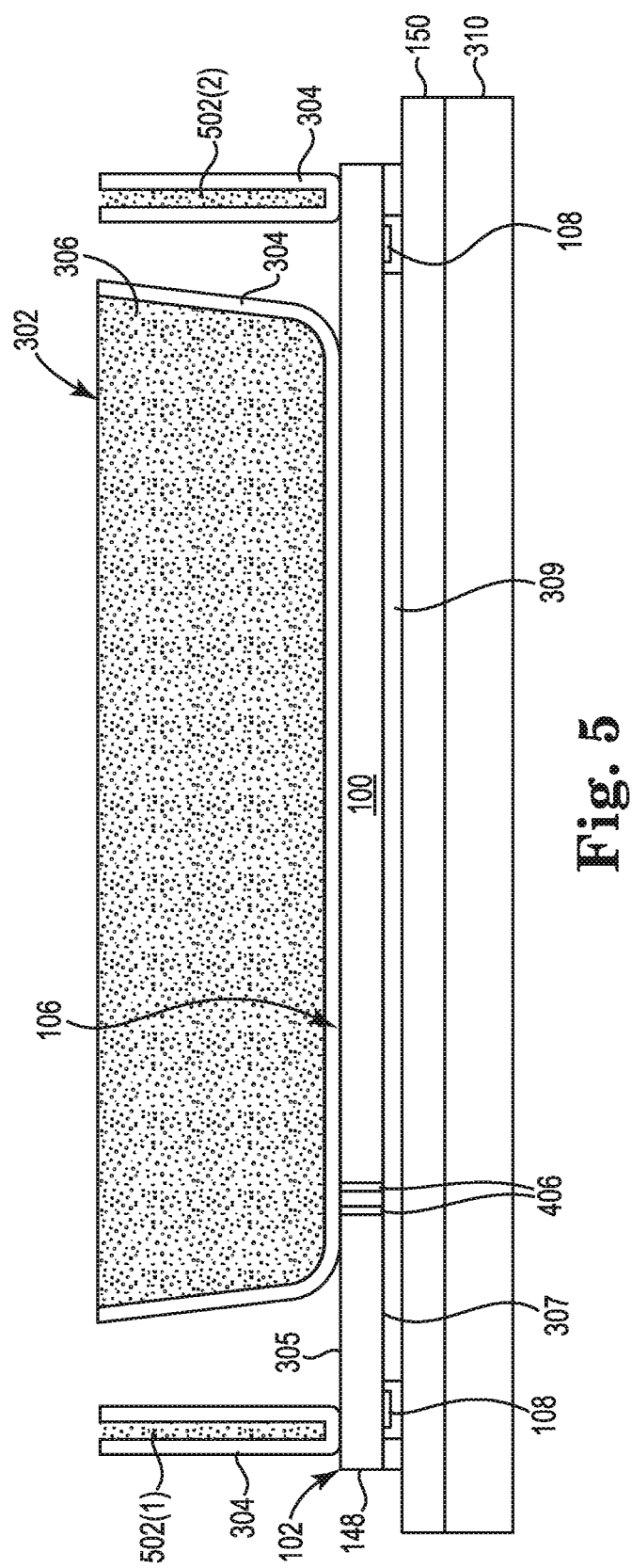
FIG. 5 is a diagram illustrating the application of an upper mold chase, including hold-down structures, to a fluid ejection die according to one example.

FIG. 5 is a diagram illustrating the application of an upper mold chase 302, including hold-down structures 502(1) and 502(2), to a fluid ejection die 100 according to one example. FIG. 5 includes the same elements as those shown in FIG. 4, but also adds hold-down structures 502(1) and 502(2). In the illustrated example, hold-down structures 502(1) and 502(2) are elongate structures, similar to a pillar or post, that extend vertically downward from the upper mold chase 302 toward the front side 307 of the fluid ejection die 100.

Hold-down structures 502(1) and 502(2) are part of the upper mold chase 302, and are longitudinally offset from the feature 306. Release liner 304 is positioned along the bottom surface of hold-down structures 502(1) and 502(2) so as to be positioned between fluid ejection die 100 and structures 502(1) and 502(2). During the molding process, hold-down structure 502(1) applies a downward force to the end portion 102 of the fluid ejection die 100, and hold-down structure 502(2) applies a downward force to the end portion 104 of the fluid ejection die 100, which helps eliminate EMC flash in the regions of the contact pads 108. A single hold-down structure, or multiple hold down structures, may be used, and characteristics (e.g., size, shape, and/or sidewall angles) of these structures may vary. In one example, the thickness and width of the hold-down structures 502(1) and 502(2) are each at least 100 microns.

FIGS. 6-12 are diagrams illustrating a top view of a portion of the fluid ejection device 200 shown in FIG. 2 according to one example. As shown in FIG. 6, contact pads 108 are positioned on the front side 307 of the die 100. Slot 204 and hold-down structure 502(3) are positioned on the back side 305 of the die, and are, therefore, shown with dashed lines in FIG. 6. The slot 204 has a uniform width or a substantially uniform width along its length. Hold-down structure 502(3), which is part of upper mold chase 302 and is used during the molding of fluid ejection device 200, is longitudinally positioned between contact pads 108 and slot 204, and is longitudinally aligned with the contact pads 108 and the slot 204.

The slot 204 is defined by the slot molding feature 306 (FIG. 3) of the upper mold chase 302. The length between the longitudinal end 148 of the die and the longitudinal end 602 of the slot 204 defines the cantilever length 404 (FIG. 4). Since the hold-down structure 502(3) is positioned closer to the longitudinal end 148 than the slot molding feature 306 (and correspondingly the resulting slot 204), the cantilever length 404 is reduced to a smaller effective cantilever length 602, which is the length between a longitudinal end 604 of the structure 502(3) and the longitudinal end 148 of the die 100. In one example, the effective cantilever length 602 is less than 1.5 mm. In another example, the effective cantilever length 602 is less than 1.3 mm. In yet another example, the effective cantilever length 602 is less than 1.1 mm. Moving the structure 502(3) closer to the longitudinal end 148 of the die 100 results in a reduction in the effective cantilever length 602.

As shown in FIG. 6, the hold-down structure 502(3) has a lateral cross-sectional area that is substantially square shaped. In other examples, the lateral cross-sectional area may have other shapes, including rectangle, circle, oval, triangle, as well as others.

As shown in FIG. 7, hold-down structures 502(4) and 502(5), which are part of upper mold chase 302 and are used during the molding of fluid ejection device 200, are longitudinally positioned between contact pads 108 and slot 204, and are laterally aligned with each other (i.e., not longitudinally offset). Each of the structures 502(4) and 502(5) is laterally offset from the contact pads 108, and has a lateral cross-sectional area that is smaller than that of the structure 502(3) shown in FIG. 6.

As shown in FIG. 8, hold-down structures 502(6) and 502(7), which are part of upper mold chase 302 and are used during the molding of fluid ejection device 200, are respectively positioned adjacent two corners of the die 100 between contact pads 108 and the longitudinal end 148 of the die. Structures 502(6) and 502(7) are laterally aligned with each other. Each of the structures 502(6) and 502(7) is laterally offset from the contact pads 108, and has a lateral cross-sectional area that is smaller than that of the structure 502(3) shown in FIG. 6.

As shown in FIG. 9, hold-down structures 502(8)-502(17), which are part of upper mold chase 302 and are used during the molding of fluid ejection device 200, are all positioned adjacent lateral ends 103 and 105 of die 100. Structures 502(8)-502(12) are longitudinally aligned with each other, and are positioned adjacent lateral end 103, and structures 502(13)-502(17) are longitudinally aligned with each other, and are positioned adjacent lateral end 105. Structures 502(8) and 502(13) are respectively positioned adjacent two corners of the die 100 between contact pads 108 and the longitudinal end 148 of the die. Structures 502(8) and 502(13) are laterally aligned with each other (i.e., not longitudinally offset), and are laterally offset from the contact pads 108. Structures 502(9)-502(11) are positioned between contact pads 108 and lateral end 103. Structures 502(14)-502(16) are positioned between contact pads 108 and lateral end 105. Structures 502(12) and 502(17) are positioned between contact pads 108 and slot 204, and are laterally aligned with each other. Each of the structures 502(12) and 502(17) is laterally offset from the contact pads 108. Each of the structures 502(8)-502(17) has a lateral cross-sectional area that is smaller than that of the structure 502(3) shown in FIG. 6.

Figure 10:
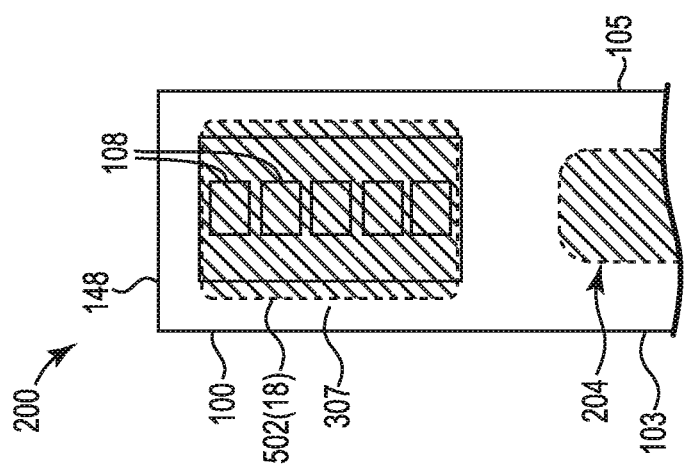

As shown in FIG. 10, hold-down structure 502(18), which is part of upper mold chase 302 and is used during the molding of fluid ejection device 200, is longitudinally positioned between slot 204 and longitudinal end 148, and completely covers or overlaps the contact pads 108 from the top view.

Figure 11:
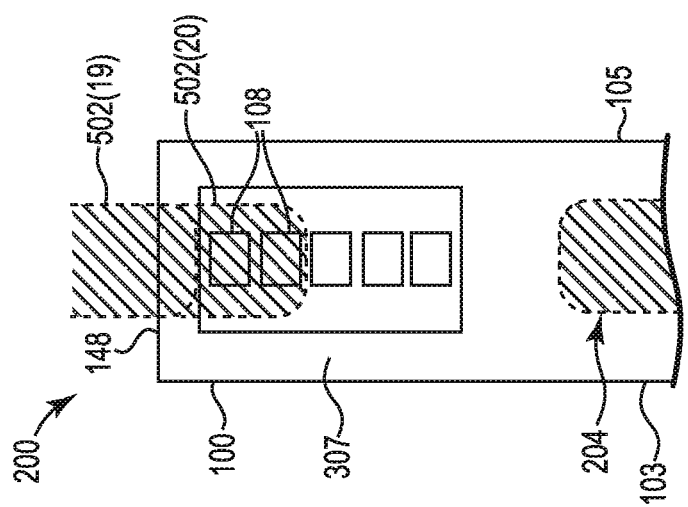

As shown in FIG. 11, hold-down structure 502(19), which is part of upper mold chase 302 and is used during the molding of fluid ejection device 200, has one longitudinal end that is longitudinally positioned between contact pads 108 and the longitudinal end 148 of the die 100, and another longitudinal end that longitudinally extends beyond the longitudinal end 148 of the die 100. Hold-down structure 502(19) may be longitudinally extended as represented by hold-down structure 502(20). Hold-down structure 502(20) has one longitudinal end that extends into the region of the contact pads 108 such that the hold-down structure 502(20) covers at least one of the contact pads 108 (e.g., two contacts pads 108 in the illustrated example) in the top view. The other longitudinal end of the hold-down structure 502(20) longitudinally extends beyond the longitudinal end 148 of the die 100. Hold-down structure 502(20) may cover more or less than two contact pads 108, including covering all of the contact pads 108.

Figure 12:
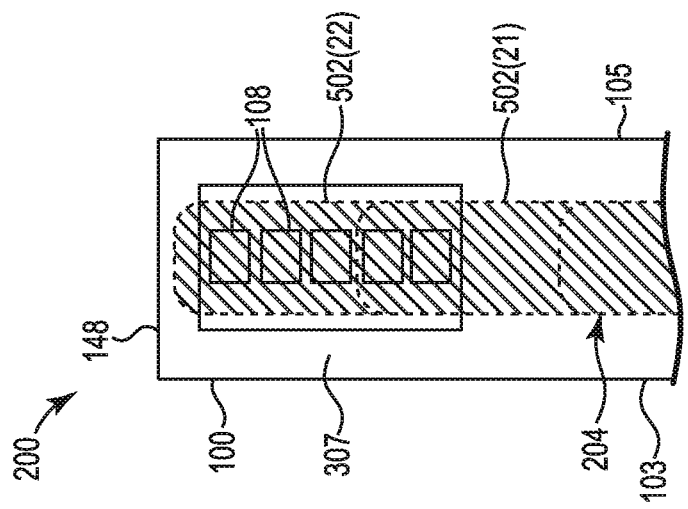

As shown in FIG. 12, hold-down structure 502(21), which is part of upper mold chase 302 and is used during the molding of fluid ejection device 200, longitudinally extends from slot 204 to a longitudinal end positioned in the region of the contact pads 108 such that the hold-down structure 502(21) covers at least one of the contact pads 108 (e.g., two contact pads 108 in the illustrated example) in the top view. Hold-down structure 502(21) may cover more or less than two contact pads 108. Hold-down structure 502(21) may be longitudinally extended as represented by hold-down structure 502(22). Hold-down structure 502(22) longitudinally extends from slot 204 to a longitudinal end positioned adjacent the longitudinal end 148 of the die 100 such that the hold-down structure 502(22) covers all of the contact pads 108 in the top view.

Figure 13:
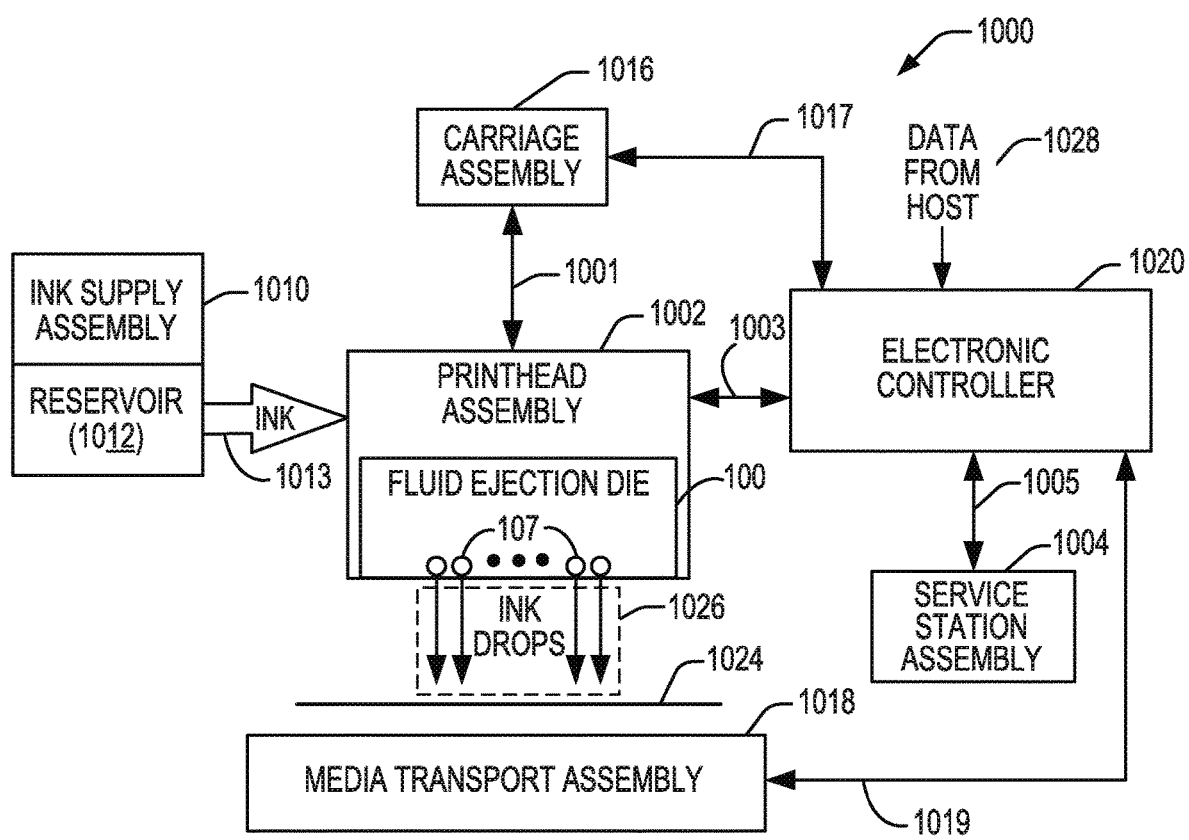
FIG. 13 is a block diagram illustrating a fluid ejection system according to one example.

FIG. 13 is a block diagram illustrating a fluid ejection system 1000 according to one example. Fluid ejection system 1000 includes a fluid ejection assembly, such as printhead assembly 1002, and a fluid supply assembly, such as ink supply assembly 1010. In one example, printhead assembly 1002 may include a fluid ejection device 200 of FIG. 2. In the illustrated example, fluid ejection system 1000 also includes a service station assembly 1004, a carriage assembly 1016, a print media transport assembly 1018, and an electronic controller 1020. While the following description provides examples of systems and assemblies for fluid handling with regard to ink, the disclosed systems and assemblies are also applicable to the handling of fluids other than ink.

Printhead assembly 1002 includes at least one printhead or fluid ejection die 100 previously described and illustrated with reference to FIG. 1, which ejects drops of ink or fluid through a plurality of orifices or nozzles 107. In one example, the drops are directed toward a medium, such as print media 1024, so as to print onto print media 1024. In one example, print media 1024 includes any type of suitable sheet material, such as paper, card stock, transparencies, Mylar, fabric, and the like. In another example, print media 1024 includes media for three-dimensional (3D) printing, such as a powder bed, or media for bioprinting and/or drug discovery testing, such as a reservoir or container. In one example, nozzles 107 are arranged in at least one column or array such that properly sequenced ejection of ink from nozzles 107 causes characters, symbols, and/or other graphics or images to be printed upon print media 1024 as printhead assembly 1002 and print media 1024 are moved relative to each other.

Ink supply assembly 1010 supplies ink to printhead assembly 1002 and includes a reservoir 1012 for storing ink. As such, in one example, ink flows from reservoir 1012 to printhead assembly 1002. In one example, printhead assembly 1002 and ink supply assembly 1010 are housed together in an inkjet or fluid-jet print cartridge or pen. In another example, ink supply assembly 1010 is separate from printhead assembly 1002 and supplies ink to printhead assembly 1002 through an interface connection 1013, such as a supply tube and/or valve.

Carriage assembly 1016 positions printhead assembly 1002 relative to print media transport assembly 1018, and print media transport assembly 1018 positions print media 1024 relative to printhead assembly 1002. Thus, a print zone 1026 is defined adjacent to nozzles 107 in an area between printhead assembly 1002 and print media 1024. In one example, printhead assembly 1002 is a scanning type printhead assembly such that carriage assembly 1016 moves printhead assembly 1002 relative to print media transport assembly 1018. In another example, printhead assembly 1002 is a non-scanning type printhead assembly such that carriage assembly 1016 fixes printhead assembly 1002 at a prescribed position relative to print media transport assembly 1018.

Service station assembly 1004 provides for spitting, wiping, capping, and/or priming of printhead assembly 1002 to maintain the functionality of printhead assembly 1002 and, more specifically, nozzles 107. For example, service station assembly 1004 may include a rubber blade or wiper which is periodically passed over printhead assembly 1002 to wipe and clean nozzles 107 of excess ink. In addition, service station assembly 1004 may include a cap that covers printhead assembly 1002 to protect nozzles 107 from drying out during periods of non-use. In addition, service station assembly 1004 may include a spittoon into which printhead assembly 1002 ejects ink during spits to ensure that reservoir 1012 maintains an appropriate level of pressure and fluidity, and to ensure that nozzles 107 do not clog or weep. Functions of service station assembly 1004 may include relative motion between service station assembly 1004 and printhead assembly 1002.

Electronic controller 1020 communicates with printhead assembly 1002 through a communication path 1003, service station assembly 1004 through a communication path 1005, carriage assembly 1016 through a communication path 1017, and print media transport assembly 1018 through a communication path 1019. In one example, when printhead assembly 1002 is mounted in carriage assembly 1016, electronic controller 1020 and printhead assembly 1002 may communicate via carriage assembly 1016 through a communication path 1001. Electronic controller 1020 may also communicate with ink supply assembly 1010 such that, in one implementation, a new (or used) ink supply may be detected.

Electronic controller 1020 receives data 1028 from a host system, such as a computer, and may include memory for temporarily storing data 1028. Data 1028 may be sent to fluid ejection system 1000 along an electronic, infrared, optical or other information transfer path. Data 1028 represent, for example, a document and/or file to be printed. As such, data 1028 form a print job for fluid ejection system 1000 and includes at least one print job command and/or command parameter.

In one example, electronic controller 1020 provides control of printhead assembly 1002 including timing control for ejection of ink drops from nozzles 107. As such, electronic controller 1020 defines a pattern of ejected ink drops which form characters, symbols, and/or other graphics or images on print media 1024. Timing control and, therefore, the pattern of ejected ink drops, is determined by the print job commands and/or command parameters. In one example, logic and drive circuitry forming a portion of electronic controller 1020 is located on printhead assembly 1002. In another example, logic and drive circuitry forming a portion of electronic controller 1020 is located off printhead assembly 1002.

Examples disclosed herein provide the following features: (1) Enable the use of a slot molding process by reducing or eliminating the contact pad EMC flash issue; (2) use a robust mold process that is less sensitive to slot misalignment; (3) eliminate the silicon slotting process, which reduces the die cost; (4) minimize die cracking by avoiding mechanical/laser damage to the silicon; and (5) superior slot sidewall quality/smoothness to avoid particle shedding issues.

Figure 14:
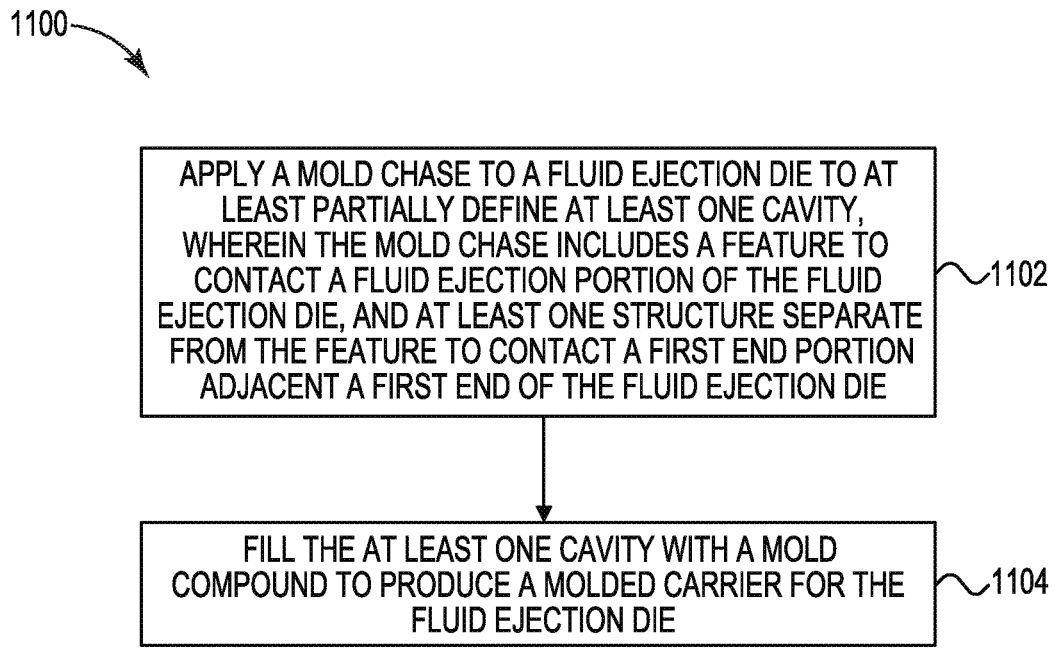
FIG. 14 is a flow diagram illustrating a method of manufacturing a fluid ejection device according to one example.

One example of this disclosure is directed to a method of manufacturing a fluid ejection device. FIG. 14 is a flow diagram illustrating a method 1100 of manufacturing a fluid ejection device according to one example. At 1102 in method 1100, a mold chase is applied to a fluid ejection die to at least partially define at least one cavity, wherein the mold chase includes a feature to contact a fluid ejection portion of the fluid ejection die, and at least one structure separate from the feature to contact a first end portion adjacent a first end of the fluid ejection die. At 1104, the at least one cavity is filled with a mold compound to produce a molded carrier for the fluid ejection die.

The fluid ejection die in the method 1100 may include a fluid feed hole positioned in the fluid ejection portion, and the feature may cover the fluid feed hole during the filling of the at least one cavity. The feature in the method 1100 may define a slot in the molded carrier to provide fluid to the fluid feed hole. The first end in the method 1100 may be a first longitudinal end of the fluid ejection die. The fluid ejection die in the method 1100 may include a contact pad positioned in the first end portion. The at least one structure in the method 1100 may be longitudinally positioned along the fluid ejection die between the contact pad and the feature. The at least one structure in the method 1100 may include first and second structures that are laterally offset from each other and longitudinally positioned along the fluid ejection die between the contact pad and the feature. The at least one structure in the method 1100 may include first and second structures respectively positioned adjacent first and second corners of the fluid ejection die at the first end. The at least one structure in the method 1100 may include a first plurality of structures laterally positioned between the contact pad and a first lateral end of the fluid ejection die, and a second plurality of structures laterally positioned between the contact pad and a second lateral end of the fluid ejection die. The at least one structure in method 1100 may be longitudinally positioned along the fluid ejection die to overlap the contact pad.

Figure 15:
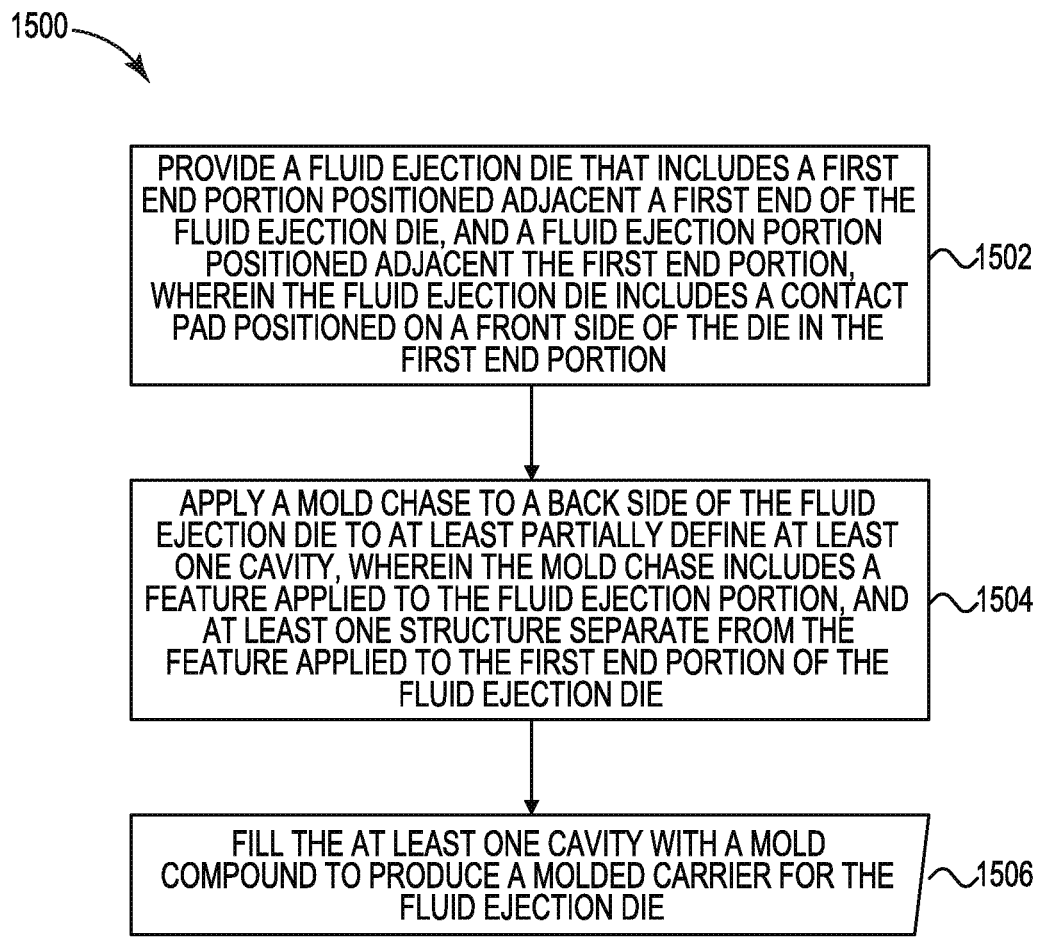
FIG. 15 is a flow diagram illustrating a method of manufacturing a fluid ejection device according to another example.

FIG. 15 is a flow diagram illustrating a method 1500 of manufacturing a fluid ejection device according to another example. At 1502, the method 1500 includes providing a fluid ejection die that includes a first end portion positioned adjacent a first end of the fluid ejection die, and a fluid ejection portion positioned adjacent the first end portion, and wherein the fluid ejection die includes a contact pad positioned on a front side of the die in the first end portion. At 1504, the method 1500 includes applying a mold chase to a back side of the fluid ejection die to at least partially define at least one cavity, wherein the mold chase includes a feature applied to the fluid ejection portion, and at least one structure separate from the feature applied to the first end portion of the fluid ejection die. At 1506, the method 1500 includes filling the at least one cavity with a mold compound to produce a molded carrier for the fluid ejection die.

The at least one structure in the method 1500 may include a structure longitudinally positioned along the fluid ejection die between the feature and a contact pad in the first end portion of the fluid ejection die. The at least one structure in the method 1500 may include a structure that longitudinally extends beyond the first end of the fluid ejection die.

Figure 16:
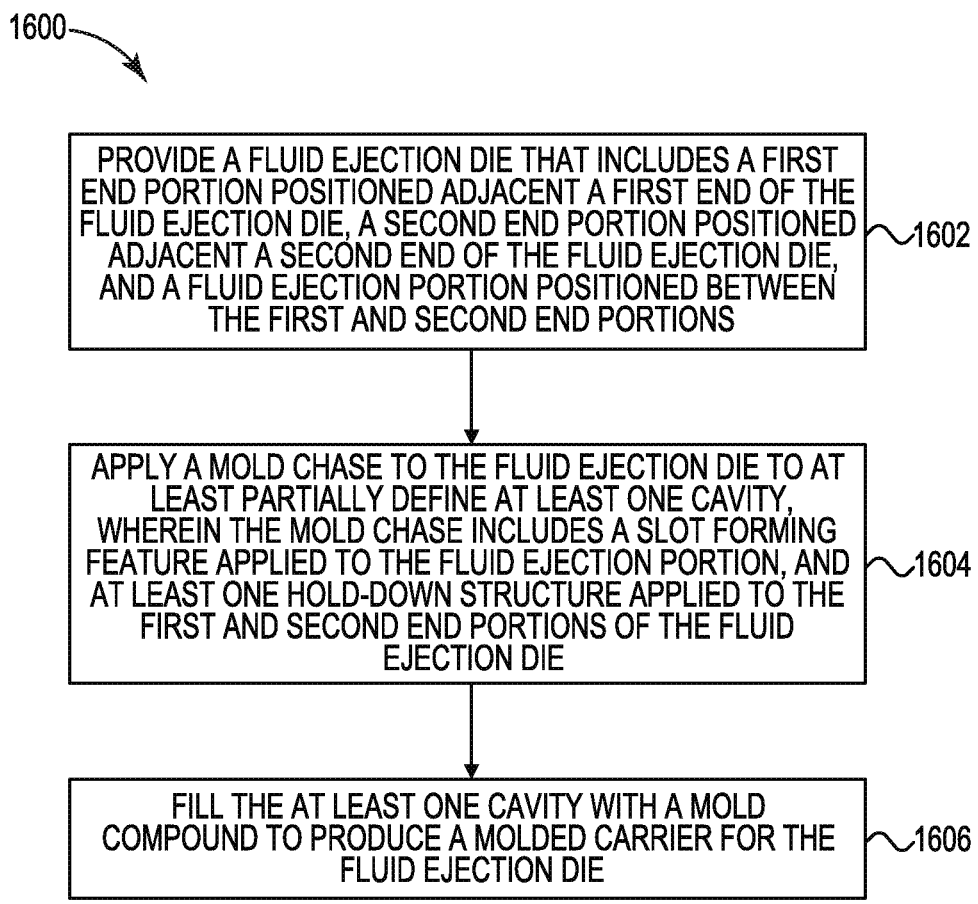
FIG. 16 is a flow diagram illustrating a method of manufacturing a fluid ejection device according to another example.

FIG. 16 is a flow diagram illustrating a method 1600 of manufacturing a fluid ejection device according to another example. At 1602, the method 1600 includes providing a fluid ejection die that includes a first end portion positioned adjacent a first end of the fluid ejection die, a second end portion positioned adjacent a second end of the fluid ejection die, and a fluid ejection portion positioned between the first and second end portions. At 1604, the method 1600 includes applying a mold chase to the fluid ejection die to at least partially define at least one cavity, wherein the mold chase includes a slot forming feature applied to the fluid ejection portion, and at least one hold-down structure applied to the first and second end portions of the fluid ejection die. At 1606, the method 1600 includes filling the at least one cavity with a mold compound to produce a molded carrier for the fluid ejection die.

The at least one hold-down structure in the method 1600 may include a first structure applied to the first end portion, and a length between an end of the first structure and the first end of the fluid ejection die may be less than 1.5 mm.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
applying a mold chase to a fluid ejection die to at least partially define at least one cavity, wherein the mold chase includes a feature to contact a fluid ejection portion of the fluid ejection die, and at least one structure separate from the feature to contact a first end portion adjacent a first end of the fluid ejection die; and
filling the at least one cavity with a mold compound to produce a molded carrier for the fluid ejection die wherein the fluid ejection die includes a contact pad positioned in the first end portion, wherein the at least one structure includes a first plurality of structures laterally positioned between the contact pad and a first lateral end of the fluid ejection die, and a second plurality of structures laterally positioned between the contact pad and a second lateral end of the fluid ejection die.

2. The method of claim 1, wherein the fluid ejection die includes a fluid feed hole positioned in the fluid ejection portion, and wherein the feature covers the fluid feed hole during the filling of the at least one cavity.

3. The method of claim 2, wherein the feature defines a slot in the molded carrier to provide fluid to the fluid feed hole.

4. The method of claim 1, wherein the first end is a first longitudinal end of the fluid ejection die.

5. The method of claim 1, wherein the fluid ejection die includes a contact pad positioned in the first end portion.

6. The method of claim 1, wherein the at least one structure is longitudinally positioned along the fluid ejection die between the contact pad and the feature.

7. The method of claim 1, wherein the at least one structure includes first and second structures that are laterally offset from each other and longitudinally positioned along the fluid ejection die between the contact pad and the feature.

8. The method of claim 1, wherein the at least one structure includes first and second structures respectively positioned adjacent first and second corners of the fluid ejection die at the first end.

9. The method of claim 1, wherein the at least one structure is longitudinally positioned along the fluid ejection die to overlap the contact pad.

10. A method, comprising:
providing a fluid ejection die that includes a first end portion positioned adjacent a first end of the fluid ejection die, and a fluid ejection portion positioned adjacent the first end portion, wherein the fluid ejection die includes a contact pad positioned on a front side of the die in the first end portion;
applying a mold chase to a back side of the fluid ejection die to at least partially define at least one cavity, wherein the mold chase includes a feature applied to the fluid ejection portion, and at least one structure separate from the feature applied to the first end portion of the fluid ejection die; and
filling the at least one cavity with a mold compound to produce a molded carrier for the fluid ejection die, wherein the at least one structure includes a first plurality of structures laterally positioned between the contact pad and a first lateral end of the fluid ejection die, and a second plurality of structures laterally positioned between the contact pad and a second lateral end of the fluid ejection die.

11. The method of claim 10, wherein the at least one structure includes a structure longitudinally positioned along the fluid ejection die between the feature and a contact pad in the first end portion of the fluid ejection die.

12. The method of claim 10, wherein the at least one structure includes a structure that longitudinally extends beyond the first end of the fluid ejection die.

13. A method, comprising:
providing a fluid ejection die that includes a first end portion positioned adjacent a first end of the fluid ejection die, a second end portion positioned adjacent a second end of the fluid ejection die, and a fluid ejection portion positioned between the first and second end portions;
applying a mold chase to the fluid ejection die to at least partially define at least one cavity, wherein the mold chase includes a slot forming feature applied to the fluid ejection portion, and at least one hold-down structure applied to the first and second end portions of the fluid ejection die; and
filling the at least one cavity with a mold compound to produce a molded carrier for the fluid ejection die, wherein the at least one hold-down structure includes a first structure applied to the first end portion, and wherein a length between an end of the first structure and the first end of the fluid ejection die is less than 1.5 mm.

* * * * *